July 22, 1958 D. C. JAMESON 2,844,723
STABLE TRIGGERED CIRCUIT HAVING NOVEL OUTPUT CIRCUITS
Filed Feb. 10, 1956 2 Sheets-Sheet 1

DONALD C. JAMESON,
INVENTOR

BY [signature]

ATTORNEY

July 22, 1958 D. C. JAMESON 2,844,723

STABLE TRIGGERED CIRCUIT HAVING NOVEL OUTPUT CIRCUITS

Filed Feb. 10, 1956 2 Sheets-Sheet 2

DONALD C. JAMESON,
INVENTOR

BY [signature]

ATTORNEY

United States Patent Office
2,844,723
Patented July 22, 1958

2,844,723

STABLE TRIGGERED CIRCUIT HAVING NOVEL OUTPUT CIRCUITS

Donald C. Jameson, Los Angeles, Calif., assignor to Hughes Aircraft Company, Culver City, Calif., a corporation of Delaware Application February 10, 1956, Serial No. 564,674

7 Claims. (Cl. 250—27)

Figure 2:
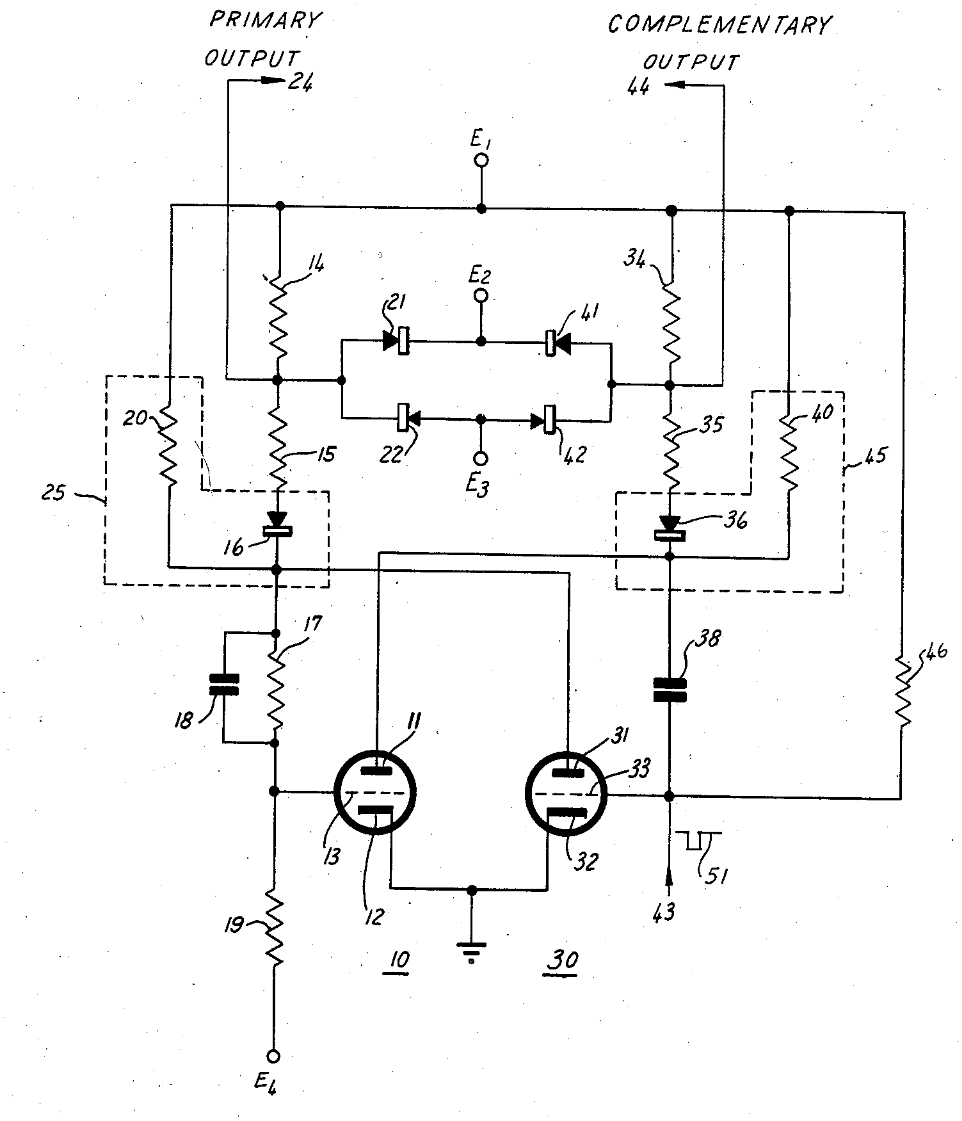

This invention relates to triggered circuits, and more particularly to monostable or bistable circuits having novel output circuits.

Triggered circuits both of the bistable and the monostable types are widely used for various computation and control applications. Bistable circuits, for example, are used in digital computation equipment to store a binary digit having a value of either 0 or 1 indicated by the conduction state of the bistable circuit. Bistable circuits are also used in control applications such as turning a relay on or off. Monostable circuits find wide application for various timing and control purposes, such as for generating a voltage wave having a time duration corresponding to that of the unstable state of the circuit.

It has been found increasingly desirable in various computer and control applications to provide each output circuit of a trigger with voltage clamps for limiting the maximum positive and negative excursions of the output voltage signal. A problem is presented, however, in the conventional triggered circuit utilizing a pair of cross-coupled electron discharge devices, inasmuch as the clamping of the voltage swing of the output circuits tends to inhibit the regenerative action within the triggered circuit by means of which the circuit triggers itself from one state of conductivity to the other. Thus, limiting the maximum voltage swing occurring on the plate of one electron discharge device imposes a corresponding limitation upon the voltage swing provided from that plate to the grid of the opposite device for triggering the circuit, which in turn tends to decrease the reliability of the triggering response of the circuit.

It is, therefore, an object of the invention to provide trigger circuits of the type having voltage-clamped output circuits in combination with a novel circuit providing very stable and reliable trigger circuit.

A further object of the invention is to provide, in triggered circuits having voltage-clamped output circuits, means for preventing the clamping of the output circuits from inhibiting the regenerative switching action within the trigger.

According to the present invention a conventional trigger is modified by including therein a pair of diode severance circuits in the output circuits. A diode severance circuit in accordance with the present invention, includes a diode and a resistor connected substantially in parallel, the diode being operable to permit a flow of current in only the forward direction, and the resistor being operable to provide a flow of current under certain conditions of operation when the diode is back-biased. A diode severance circuit associated with a particular electron discharge device in a trigger permits that device to operate normally when it is conductive and the associated output voltage taken from the plate of the device is low. However, when that discharge device becomes non-conductive and its associated output voltage assumes a high level, the diode in the diode severance circuit becomes back-biased and the flow of current through the resistor permits the plate of this non-conducting device to swing positively with respect to the upper clamping voltage of the output signal. Thus, regenerative action within the trigger for switching the circuit to the opposite state of conductivity is not inhibited by the clamping of the output voltage signal.

According to one embodiment of the invention a conventional bistable circuit is modified by including a pair of diode severance circuits, one associated with each electron discharge device. The full voltage swing available on the plate of each device is utilized in controlling the grid of the opposite device, since the diode severance circuit effectively isolates the internal or regenerative action of the circuit from the external action, namely, the clamped output circuits.

According to another embodiment of the invention a conventional monostable circuit is likewise modified by including a pair of diode severance circuits, with similar results.

The novel features which are believed to be characteristic of the invention, both as to its organization and method of operation, together with further objects and advantages thereof, will be better understood from the following description considered with the accompanying drawings in which several embodiments of the invention are illustrated by way of example. It is to be expressly understood, however, that the drawings are for the purpose of illustration and description only, and are not intended as a definition of the limits of the invention.

Figure 1:
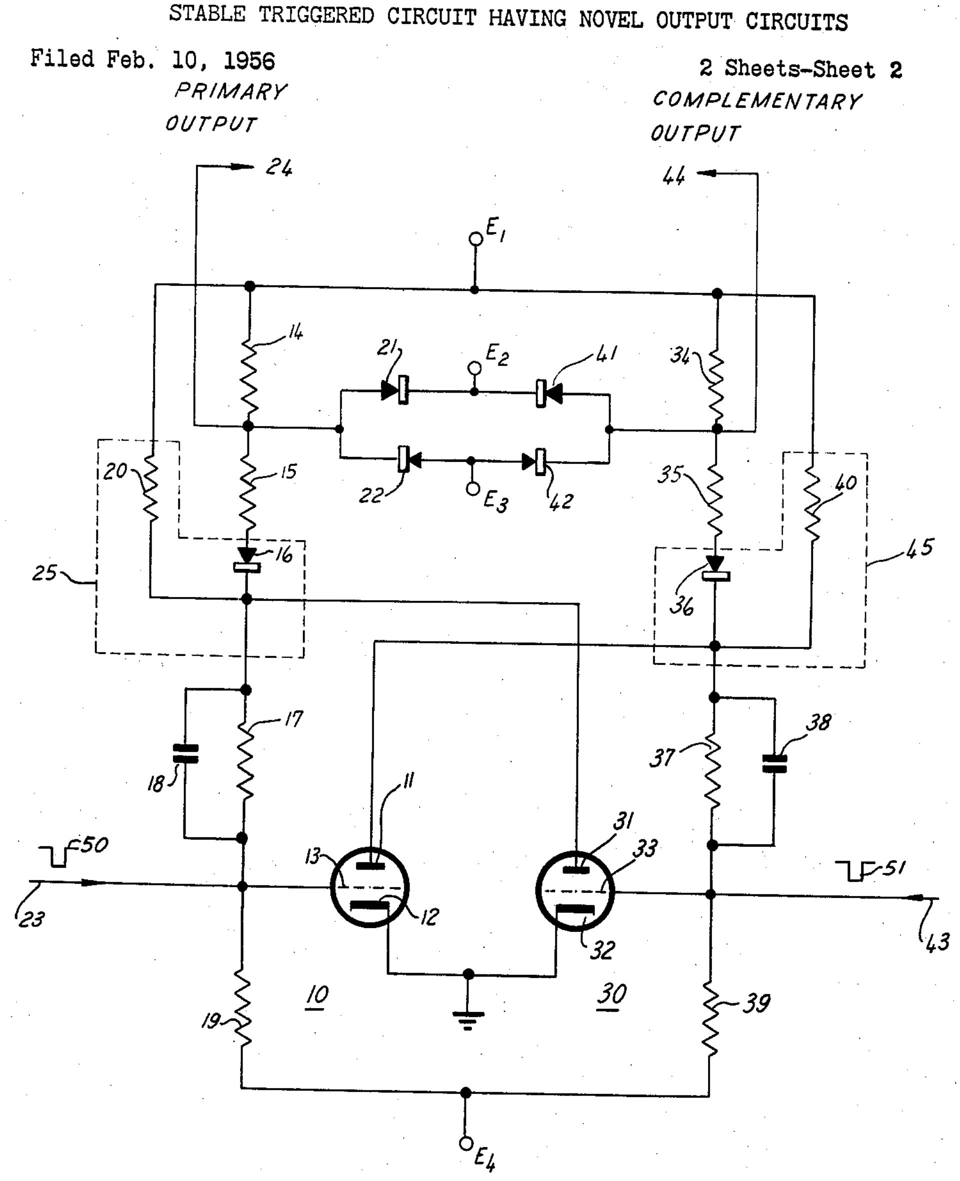

Fig. 1 is a schematic circuit diagram of a bistable circuit in accordance with the present invention; and Fig. 2 is a schematic circuit diagram of a monostable circuit in accordance with the present invention.

Referring now to Fig. 1 there is shown a bistable circuit utilizing triodes 10 and 30 which, in addition to other conventional structure, includes a pair of diode severance circuits 25 and 45, each enclosed by a dotted line.

Fig. 1 shows an input lead 23 to which negative pulses may be applied for triggering the circuit in one direction and another input lead 43 for triggering the circuit in the opposite direction, although it will be understood that the two input leads may, if desired, be connected together and controlled from a single source of input signals. A primary signal output lead 24 and a complementary signal output lead 44 are also shown, although it will be understood that if desired only a single one of these output signals need be utilized.

In the circuit of Fig. 1 a number of voltage sources providing reference levels are indicated by means of reference characters $E_1$ . . . $E_4$. Source $E_1$ is the positive power supply source for energizing the entire circuit; $E_2$ provides the upper clamping level for the output signals, and is somewhat less positive than $E_1$; $E_3$ provides the lower clamping level for the output signals and is somewhat less positive than $E_2$; and $E_4$ is a grid-biasing potential which is negative with respect to ground. Thus, the terminals $E_1$ and ground provide the primary source of direct current energy for the circuit, whereas terminal $E_4$ provides grid-biasing action and aids in the regenerative switching action within the circuit. Terminals $E_2$ and $E_3$ are required only for clamping the output signals in such a manner that while one of the output signals is at the upper level corresponding to $E_2$ the other output signal is at the lower level corresponding to $E_3$.

Now tracing the circuit of Fig. 1 in detail, triode 10 includes a plate 11, a cathode 12, and a grid 13, whereas triode 30 includes similar elements designated as 31, 32, and 33, respectively. Cathodes 12 and 32 are tied together and connected to ground. A pair of resistors 14 and 15 are connected serially between terminal $E_1$ and the anode of a diode 16 which has its cathode connected to plate 31, thus providing a path for current flowing through triode 30 when triode 30 conducts. A similar plate load circuit is provided for triode 10 by means of resistors 34 and 35 serially connected between terminal $E_1$ and the anode of a diode 36 which has its cathode connected to plate 11 of triode 10.

Plate 31 of triode 30 is cross-coupled to grid 13 of triode 10 by means of a resistor 17, and a capacitor 18 in parallel with resistor 17. Plate 11 of tube 10 is likewise cross-coupled to grid 33 of triode 30 by means of a resistor 37 and parallel capacitor 38. Input lead 23 is connected directly to grid 13 and input lead 43 is connected to grid 33. A grid bias resistor 19 is connected between grid 13 and terminal $E_4$ and a grid bias resistor 39 between grid 33 and $E_4$.

Primary output lead 24 is connected to the junction between resistors 14 and 15 while complementary output lead 44 is connected to the junction between resistors 34 and 35. For clamping the output signals at the upper voltage level $E_2$, a diode 21 has its anode connected to lead 24 and its cathode to terminal $E_2$ while a diode 41 has its anode connected to lead 44 and its cathode to terminal $E_2$. Clamping at the lower level $E_3$ is provided by a diode 22 having its cathode connected to lead 24 and its anode to terminal $E_3$, and a diode 42 having its cathode connected to lead 44 and its anode to terminal $E_3$.

A resistor 20 connected between terminal $E_1$ and plate 31, and a resistor 40 connected between terminal $E_1$ and plate 11, constitute portions of the diode severance circuits, as will be explained.

Before explaining the operation and effect of the diode severance circuit provided by the present invention, it will be convenient to first summarize the operation of the conventional bistable circuit. Thus the circuit of Fig. 1, omitting the diode severance circuits 24, 45, would have resistor 15 connected directly to capacitor 18, resistor 17, and plate 31; and resistor 35 connected directly to resistor 37, capacitor 38, and plate 11. This, then, would be an entirely conventional bistable circuit. As is well known, such a circuit has two stable states and by means of appropriate input signals can be triggered from one state to another. The operation of such a conventional circuit will be summarized under three headings: conditions existing during a first stable state; the circuit action during transition from one state to the other; and conditions existing during a subsequent second stable state.

A first stable state of the conventional circuit may be assumed to exist when triode 10 is conducting and triode 30 is not conducting. Output lead 44 is then at the lower voltage level, being clamped at $E_3$ by clamping action of diode 42. Output lead 24 is clamped at the higher voltage level $E_2$ by action of diode 21. Application of a negative pulse as shown at 50 on input lead 23 to grid 13 of triode 10 turns triode 10 off. The potential at plate 11 then rises, and the potential of grid 33 is correspondingly lifted by the coupling action of networks 37, 38. Triode 30 then starts to conduct and the switching is completed by regenerative action of the circuit. During the regenerative action a small upward swing of grid 33 results in a larger downward swing of plate 31, which is transmitted to grid 13. The downward swing of grid 13 in turn produces an upward swing of larger amplitude on plate 11, which is in turn transmitted to grid 33, and so forth. Finally, tube 10 is rendered completely non-conducting while tube 30 becomes fully conductive in a saturated condition.

A second stable state of the conventional circuit then exists when tube 30 is conductive and tube 10 is non-conductive. Output lead 24 is then at the lower potential being clamped at $E_3$, and output lead 44 is at the higher potential being clamped at $E_2$. A negative pulse such as shown at 51 applied via input lead 43 to grid 33 is effective to turn tube 30 off, and regenerative switching action of the circuit is completed in the manner previously described.

In the conventional circuit whose operation is now being described (where diode severance circuits 25, 45, are omitted), the voltage swing on output leads 24, 44, is limited to the potential difference between clamping levels $E_2$ and $E_3$. For example, if the difference between the clamping levels is 15 volts, then the voltages on leads 24, 44 can change upward or downward by only 15 volts. The corresponding voltage changes on the associated plates 31, 11, however, will be substantially greater, of the order of 50 volts. During switching action the maximum voltage which can be transmitted from one plate to the opposite grid will be a fraction of the plate swing, for example, 40 percent or 20 volts. For example, when the conventional circuit is in the first stable state described above, the application of a negative pulse 50 via lead 23 to grid 13 causes triode 10 to become non-conductive, the voltage on output lead 44 rises from the $E_3$ level to the $E_2$ level, but the voltage on plate 11 rises by a greater amount. This voltage change, applied via coupling network 37, 38, to grid 33, is available for turning tube 30 on and thus triggering the circuit.

Having thus described the operation of a conventional circuit of the type shown in Fig. 1 (namely, a conventional circuit in which diode severance circuits 25, 45, are not included), the operation of the circuit of the present invention including the diode severance circuits will now be explained.

The triggering action of the circuit of Fig. 1 will be explained with reference to the previous assumption that in the first stable state tube 10 is conducting and tube 30 is non-conducting, and that a negative pulse 50 is applied via input lead 23 to grid 13 to change the circuit to the second stable state in which tube 10 is non-conducting and tube 30 is conducting. When tube 10 is conducting, current is supplied to plate 11 from power supply terminal $E_1$ via a first path including resistor 34, resistor 35, and diode 36, and also through a second path including resistor 40. Output lead 44 is clamped at the lower clamping voltage $E_3$. The potential on plate 11 is then determined by a voltage divider action of resistor 35 and tube 10, and is at a point intermediate lower clamping level $E_3$ and ground. The potential of plate 11 will to some extent be influenced by current flowing through resistor 40 to plate 11, and via resistors 37 and 39 to terminal $E_4$, although this current is generally quite small. Grid 33 of tube 30, on the other hand, will be held below cut-off by the voltage divider action of resistors 37 and 39, dividing the potential existing between plate 11 and source $E_4$. A negative trigger pulse 50 applied to grid 13 is amplified and appears as a positive pulse on plate 11 from whence it is transmitted via coupling network 37, 38, to grid 33 of tube 30. This initial pulse must provide sufficient amplitude so that grid 33 will be raised above cut-off and tube 30 will start to conduct at least slightly, in order that regenerative action may occur. Regenerative action thereafter causes the potential of plate 11 to rise further. The speed of the switching action is such that during the first part of the transient the potential across capacitor 38 changes very little, and the voltage drop across resistor 37 may be regarded as being substantially fixed.

In the absence of resistor 40 diode 36 would have no effect upon the circuit operation which would be the same as for conventional circuits, namely, current would flow from source $E_1$ through resistors 34, 35, 37, and 39 to terminal $E_4$. When grid 33 is pulled up so that its becomes positive with respect to cathode 32, rectifying action commences and the grid potential is thereafter held at substantially the cathode potential, ground. After regenerative action is complete the charging of capacitor 38 serves to permit the potential of plate 11 to rise toward its ultimate value.

The inclusion of both diode 36 and resistor 40 of severance circuit 45, however, permits the potential of plate 11 to rise considerably higher than it otherwise would be able to do. Not only may plate 11 rise to potential $E_2$, the upper voltage level at which output lead 44 is now clamped, but diode 36 becomes back-biased permitting plate 11 to become even more positive than the output lead 44. This is possible because resistor 40 acts as a plate load resistor for tube 10 operating as an amplifier.

As typical values, voltage $E_1$ may be plus 200 volts, $E_2$ may be plus 140 volts, $E_3$ may be plus 125 volts, and $E_4$ may be minus 140 volts. The values of resistors 37 and 39 may then be selected so that, for example, when tube 10 is conducting the potential of grid 33 is approximately 26 volts negative with respect to cathode 32 or ground. Also the values of resistors 40, 37, and 39 may be selected so that when tube 10 is non-conducting the potential of grid 33, in the absence of any flow of grid current, would be approximately 6 volts positive with respect to cathode 32. The values of resistors 17, 19, and 20 are selected in a similar manner. In the absence of diode severance circuit 45, and assuming the same tubes and circuit values are used, the voltage swing available for driving grid 33 would be, for example, from minus 18 volts to plus 3 volts. Thus, the use of the diode severance circuit increases by approximately 50 percent the amount of driving voltage available at the grids of the triggered circuit.

Resistors 15, 35, are necessary in the circuit of Fig. 1 for the reason that if they were omitted an undesirably large amount of current would flow from source $E_3$ through diodes 22, 42, and diodes 16, 36, and thence through the conducting triode. This might easily result in burning out of one or more of those diodes. If, for any reason, however, clamping at the lower voltage $E_3$ were not necessary, then diodes 22, 42, and resistors 15, 35, could be omitted from the circuit. In such cases the diode severance circuit would still be necessary to provide the maximum regenerative voltage swing within the triggered circuit, since it is the clamping at the upper voltage level $E_2$ which makes the diode severance necessary.

Reference is now made to Fig. 2 disclosing a monostable circuit wherein like parts are identified by the same reference characters as are used in Fig. 1. It will be noted that the changes in Fig. 2 over Fig. 1 are that input lead 23 has been omitted, resistor 37 has been omitted, and in place of resistor 37 there has been substituted a resistor 46 interconnected between power supply terminal $E_1$ and grid 33.

The circuit of Fig. 2 has only one stable state, namely, when tube 30 is conducting and tube 10 is non-conducting. The opposite state is unstable and of temporary duration since current drawn through resistor 46 evenually discharges capacitor 38 to the point where grid 33 rises above cut-off and tube 30 becomes conductive. Except for the use of the diode severance circuits, the triggered circuit of Fig. 2 is otherwise conventional. The advantage of diode severance circuit 25 is that a much larger voltage swing is provided for driving grid 13 of tube 10; and the advantage of diode severance circuit 45 is that a larger discharge time constant is provided, since plate 11 can swing more positive, thus permitting the use of a smaller capacitance value for capacitor 38 for any desired value of the circuit time constant.

What is claimed as new is:

1. A triggerable circuit comprising a pair of electron discharge devices each having an anode, cathode and a grid electrode, a common circuit connection for each of said cathode electrodes, a cross coupling network connected from said anode electrode of at least one of said devices to the grid electrode of the other device whereby the circuit has at least a single stable state, means for applying trigger signals to at least said device having its anode connected to said network to cause said circuit to respond thereto, an anode circuit for each of said devices including individual impedance means connected to said anodes, clamping means connected to each of said anode circuits for limiting the output voltage swings derived from said impedance means of said anode circuits and means connected to said anode circuits for rendering said clamping means ineffective at least during the interval said circuit is changing state in response to the trigger signals.

2. A triggerable circuit as defined in claim 6 wherein said latter mentioned means comprises impedance means connected in parallel relationship with said anode circuit and polarized means connected in said anode circuit for disconnecting said anode circuit from said anode during the interval said circuit is responding to the trigger signals whereby said impedance means functions as the anode circuit during said interval.

3. A triggerable circuit comprising a pair of electron discharge devices each having an anode, cathode and grid electrode, a common connection for each of said cathodes, a cross coupling network connected from said anode of at least one of said devices to the grid of the other device, at least a single means for applying trigger signals to said grid electrode having its anode connected to said network to cause said circuit to respond thereto, an anode circuit for each of said devices including individual impedance means connected in series circuit relationship with an individual assymmetrically conducting device, said assymmetrically conducting devices being connected to said anodes and arranged therewith to allow the normal conductive action of said electron discharge devices, clamping means connected to each of said anode circuits intermediate said impedance means and said assymmetrically conducting devices for limiting the output voltage swings of said anode circuits, and impedance means connected to said anode in parallel relationship with said anode circuit to prevent the action of said clamping means at least during the interval said circuit is responding to the trigger signals.

4. A bistable circuit comprising a pair of electron discharge devices each having an anode, cathode and grid electrode, a common circuit connection for each of said cathodes, cross coupling networks connected from each anode electrode to the grid electrode of the other device whereby the circuit has two stable states, means for applying trigger signals to at least one of said electrodes to cause said bistable circuit to change state, an anode circuit for each of said devices including individual impedance means connected to said anodes, clamping means connected to each of said anode circuits for limiting the output voltage swings derived from said impedance means of said anode circuits, and means connected in circuit relationship with said anode circuits for rendering said clamping means ineffective at least during the interval said circuit is changing state.

5. A bistable circuit comprising a pair of electron discharge devices each having an anode, cathode and grid electrodes, a common connection for each of said cathodes, cross coupling networks connected from each anode electrode to the grid electrode of the other device whereby the circuit has two stable states, means for applying trigger signals to at least one of said electrodes of each of said devices to cause said bistable circuit to change state, an anode circuit for each of said devices including individual impedance means connected in series circuit relationship with a separate asymmetrically conducting device, said asymmetrically conducting devices being connected to said anodes and arranged therewith to allow the normal conductive action of said electron discharge devices, clamping means connected to each of said anode circuits intermediate said impedance means and said asymmetrically conducting devices for limiting the output voltage swings of said anode circuits, and impedance means connected to said anode in parallel relationship with said anode circuit.

6. A bistable circuit comprising a pair of electron discharge devices each having an anode, cathode and grid electrode, a common connection for each of said cathode electrodes, cross coupling networks connected from each anode to the grid of the other device whereby the circuit has two stable states, means for applying trigger signals to said grid electrodes to cause said bistable circuit to change state, an anode circuit for each of said devices including individual impedance means connected in series circuit relationship with a diode, said diode being connected to said anode and poled to allow the normal conductive action of said electron discharge devices, clamping means connected to each of said anode circuits intermediate said impedance means and said diodes for limiting the output voltage swings of said anode circuits, and resistive impedance means connected to said anode in parallel relationship with said anode circuit whereby said diode is biased off at least during the interval said bistable circuit is changing state to thereby render said clamping means ineffective during this interval.

7. A monostable circuit comprising a pair of electron discharge devices each having an anode, cathode and grid electrodes, a common connection for each of said cathodes, a cross coupling network connected from said anode of one of said devices to the grid of the other device whereby the circuit has a single stable state, means for applying trigger signals to said grid electrode having its anode connected to said network to cause said circuit to respond thereto for momentarily changing its stable state; an anode circuit for each of said devices including individual impedance means connected in series circuit relation ship with a separate diode said diode being connected to said anodes and poled to allow the normal conductive action of said electron discharge devices; clamping means connected to each of said anode circuits intermediate said impedance means and said diode for limiting the output voltage swings of said anode circuits; impedance means connected to said anode in parallel relationship with said anode circuit, and further impedance means connected in common with said latter mentioned means and to said grid electrode receiving the trigger signals.

References Cited in the file of this patent

UNITED STATES PATENTS

| | | |
|---|---|---|
| 2,524,953 | Baker | Oct. 10, 1950 |
| 2,624,839 | Havens | Jan. 6, 1953 |
| 2,665,845 | Trent | Jan. 12, 1954 |
| 2,745,955 | Havens | May 15, 1956 |
| 2,745,956 | Baker | May 15, 1956 |

UNITED STATES PATENT OFFICE

CERTIFICATE OF CORRECTION

Patent No. 2,844,723 July 22, 1958

Donald C. Jameson

It is hereby certified that error appears in the printed specification of the above numbered patent requiring correction and that the said Letters Patent should read as corrected below.

Column 6, line 9, for the claim reference numeral "6" read -- 1 --; column 8, lines 5 and 6, for "relation ship" read -- relationship --.

Signed and sealed this 7th day of October 1958.

(SEAL)
Attest:

KARL H. AXLINE
Attesting Officer

ROBERT C. WATSON
Commissioner of Patents